Inventor
Louis W. Roberts
By Robert L. Slater Jr.
Attorney

HIGH POWER MICROWAVE SWITCHING DEVICE

Filed Oct. 10, 1960 3 Sheets-Sheet 2

Inventor
Louis W. Roberts
By Robert L. Slater Jr.
Attorney

HIGH POWER MICROWAVE SWITCHING DEVICE

Filed Oct. 10, 1960 3 Sheets-Sheet 3

Inventor
Louis W. Roberts
By Robert L. Slater Jr
attorney 3,017,534

HIGH POWER MICROWAVE SWITCHING DEVICE

Louis W. Roberts, Boston, Mass., assignor to Microwave Electronic Tube Company, Inc., Salem, Mass., a corporation of Delaware Filed Oct. 10, 1960, Ser. No. 61,695
13 Claims. (Cl. 315—39)

Figures 1, 2, 5, 5B, 5C:
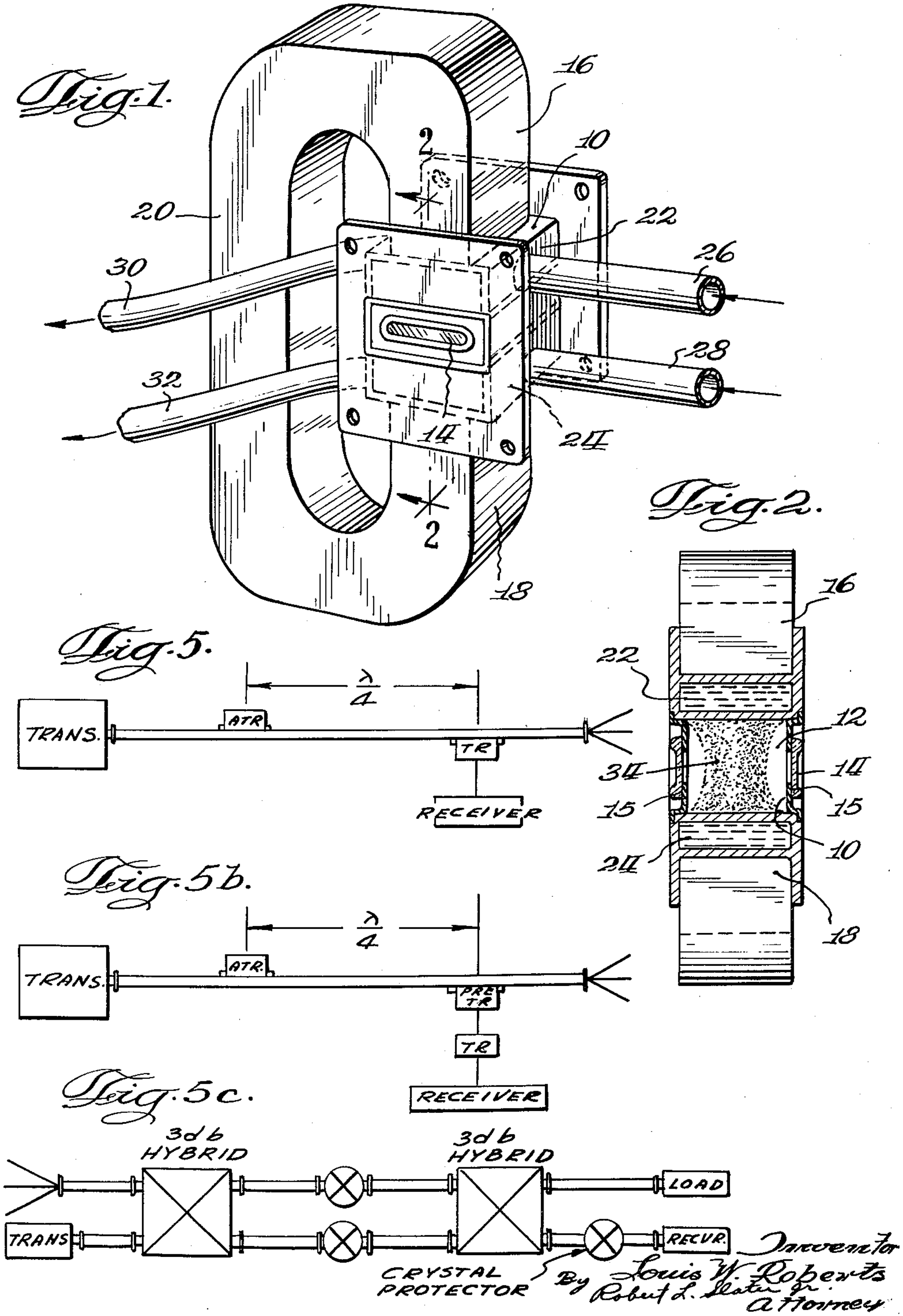

This invention relates to microwave frequency switching devices, more particularly to microwave radio frequency signal devices adapted to high power level apparatus.

Radio direction finding and ranging devices, commonly referred to as radar devices, communication systems, and telemetering links utilizing kilomegacycle or microwave radio frequencies, require devices for rapidly switching R.F. power. For instance, in radar equipment it is necessary to momentarily connect the transmitter to the antenna and isolate the sensitive receiver and, in fractions of microseconds, disconnect the transmitter and connect the receiver to the antenna in order to receive the return or echo radio signal from a target. The switches and microwave circuit for accomplishing this extremely rapid connection with the antenna and subsequent respective isolation of the transmitter and the receiver from the antenna and from one another are commonly termed duplexers. Duplexing circuits may be divided into two classes: branched circuits and balanced circuits. The branched duplexer circuits are simpler but experience losses over broad frequency bands. The balanced duplexer circuits pose more difficult design problems but incur lower losses with extended bandwidth. My invention is adaptable for use either in branched or in balanced duplexer circuits.

Heretofore microwave switching has been accomplished with gas discharge tubes. Those switching tubes designed to isolate the receiver from the antenna during transmission of a signal are commonly termed transmit-receiver, or TR tubes, and those designed to isolate the transmitter from the antenna are commonly termed anti-transmit switch tubes, or ATR tubes. TR and ATR tubes are gas filled cavities having resonant window structures and, in some instances, additional means for creating electron discharge of the gas within the cavity. These tubes have the characteristic that they propagate low power signals linearly, but become highly non-linear when incident high power signals occasion electron discharge of the gas contained therein. The recovery time required for these tubes to switch between the linear and non-linear states is an important operation feature of a microwave system. The shorter the time can be made the more useful in many applications the tube becomes. Duplexers have been constructed for frequencies of 200 to 400 megacycles per second range which work at between 50 and 100 kilowatts average and 2 to 5 megawatts peak power. At frequencies below the kilomegacycle range, the cooling surfaces in the tubes are large enough to afford dissipation of the heat generated during the gaseous discharge phase and accordingly permits continuous operation of the duplexer for extended periods of time. However, increase of the power level or increase of the frequency, which necessitates a proportional reduction of the size of the equipment and therefore loss of available cooling surface in the tube, results in shortening the operational life of the tube due to rapid gas clean up or even catastrophic failure of the container due to overheating. Hence, there is a definite upper limit to the power handling capability of presently used microwave frequency gas discharge tubes due to wall heating of these devices. Means for cooling presently used TR and ATR tubes are not entirely satisfactory because heating occurs on all interior surfaces within the tube, including the input and output windows and thus prevents application of efficient liquid coolant jacketing. The use of even such a temperature resistant substance as fused quartz dielectric materials in conventional TR and ATR tubes does not remove the limitation on power due to overheating which such tubes can handle.

There is a trend toward utilizing higher and higher power in microwave systems. It is common practice to combine the output of more than one R.F. source by means of a "combiner" unit to achieve very high antenna power levels. Such "combiner" units are similar to a branched duplexer but are subject to numerous operational difficulties. Hence, there exists a need for microwave switching devices with improved power handling capabilities. In addition, there exists a need for switching devices with shortened recovery time characteristics.

It is accordingly one object of my invention to provide a novel, universally applicable microwave switching device.

It is another object of my invention to provide a microwave gas discharge switching tube suitable for continuous switching action of large power signals at a rapid pulse repetition rate.

It is yet another object of my invention to provide a gas discharge switching device having improved recovery time characteristics.

It is another object of my invention to provide a method for duplexing substantially unlimited microwave frequency power.

It is still another object of my invention to provide a novel microwave frequency gas discharge tube suitable for use as either a TR or ATR tube with large power handling capacity.

It is another object of my invention to provide devices for duplexing multimegawatt peak power levels throughout a wide frequency band.

These and other objects and advantages of this invention will be apparent from the following drawings, specifications and claims.

My invention may be broadly described as a high frequency gas discharge tube having magnetic means for regulating the position and structure of the electron discharge plasma to control the heating characteristics of the tube and to control certain non-linear electrical characteristics of the tube. My invention is more easily understood by referring to the specific examples illustrated and described below.

It is commonly known that an electron in a magnetic field moves in a circular orbit the plane of which is normal to the direction of the magnetic field vector. An electron in the presence of an electric field upon which a parallel magnetic field has been impressed will move in a helical path about the axis of the electric field vector.

The application of a magnetic field to a gaseous plasma that is a collection of charged particles such as electrons or free radicals in gaseous state creates, so far as the density distribution of the charged particles is concerned, a phenomena termed the "linear pinch effect." An example of the linear pinch effect is observable in the distribution of electrons, for instance, in an electron plasma within a magnetic field wherein the electrons are constrained within a well defined circular cylinder in which the walls are concave or "pinched." Detailed technical descriptions of this and related natural phenomena with which the present invention is concerned are published in "The Basic Data of Plasma Physics," Sanborn C. Brown, New York, 1959.

A preferred embodiment of my invention is illustrated in FIGURES 1 and 2 wherein an envelope 10, which in the specific example is a short section of wave guide, is filled with an ionizable gas 12 such as argon. Conventional resonant windows 14 which may be made of glass are mounted by means of a gas tight seal in the ends of the wave guide 10. Magnetic poles 16 and 18 of a permanent magnet 20 are positioned on opposite sides of the wave guide 10. The magnetic field thus impressed across the wave guide is parallel with the direction of the electric vector of microwaves propagated along the wave guide 10.

Jackets 22 and 24 for liquid coolant are juxtaposed to the walls of the wave guide 10 and between the wave guide and the permanent magnet poles 16 and 18. Coolant, such water, enters the jackets 22 and 24 through conduits 26 and 28 and exits through conduits 30 and 32, respectively.

FIGURE 2 is a cross section view of FIGURE 1 taken on the plane 2—2 and illustrates in an alternate view the relationships indicated above between the envelope 10, the ionizable gas 12, the magnetic poles 16 and 18, the sealed resonant windows 14 and the coolant jackets 22 and 24. FIGURE 2 also illustrates at 34 the region of high electron density within the envelope 10 during an electron discharge period. The plasma 34 comprised of free electrons and ionized gas is constrained within a "pinched" cylindrical region extending across the envelope such as is illustrated. The particles, ions and electrons which go to make up the plasma exist only at very high temperatures. For example, the temperature of the electrons may well exceed 24,000° K; the average temperature of the positive ions is less; and the average temperature of the neutral particles and molecules of gas very much less. Consequently, it is seen that the electrons and positive ions transport most of the heat from the interior of the envelope 10 to the walls thereof.

In a conventional TR or ATR tube without an external magnetic field the heat transport to the walls is substantially equal in all directions. By the application of a suitable external magnetic field, the motion of the charged particles, both electrons and positive ions, may be controlled so that the very hot plasma is constrained to avoid the side walls of the envelope and discharge the thermal heat of the plasma through the envelope wall surfaces which intersect the external magnetic field. In the presently illustrated embodiment, heat is removed through the top and bottom envelope walls which are cooled by the coolant jackets 22 and 24.

A first approximation of the radial heat transport to the walls with and without the presence of a magnetic field is diminished in the ratio:

$$\text{(1)} \qquad \frac{H_{-r}(B)}{H_{-r}(B=0)}=\frac{1}{1+\mu_{+}\mu_{-}B^2}$$

where $H_{-r}$=radial heat transport in calories
$B$= magnetic field
$\mu_{+}$=mobility of positive ions
$\mu_{-}$=electron mobility Values for Equation 1 for argon gas at the pressures indicated and various magnetic field strengths are tabulated in Table I.

*Table I*

| Pressure, Microns | B Gauss | Ratio $\frac{H_{-r}(B)}{H_{-r}(B=0)}$ |
|---|---|---|
| 100 | 3,000 | 38.3 |
| 100 | 1,000 | 6 |
| 100 | 0 | 1 |
| 200 | 3,000 | 9.2 |
| 500 | 3,000 | 1.6 |

The numerical values of Table I indicate the ratio of reduced radial heat transport from the plasma to the radial heat transport from the plasma to the radial envelope walls in the presence of a magnetic field with the indicated gas pressure. Hence, for the conditions specified in the first line of the table, 38.3 times less heat is transported to the side walls of a TR tube such as illustrated in FIGURES 1 and 2 in the presence of an external magnetic field of 3000 gauss than would be the situation in the absence of the external magnetic field.

The necessary conditions for the successful operation of device may be stated as: (*a*) the magnetic field B must be parallel to the RF electrical field, and (*b*) the cyclotron frequency of the electrons be greater than the collision frequency of the electrons.

One of the most important electrical parameters in a gas electron discharge tube is its recovery time. The recovery or decay time determines how soon the device will be ready for the next event. The finite time required for recovery of a gaseous electron discharge device, then, must be maintained at the smallest possible value.

The steady state discharge in an ionizable gas that gains in electron density is just balanced by losses due to diffusion and other mechanisms. In a pure noble gas there are no loss mechanisms other than those due to diffusion. The electron continuity equation may then be written as:

$$\text{(2)} \qquad \frac{\partial n}{\partial t}=V_i n-D_a\nabla^2 n$$

where $n$=number of electrons
$V_i$=the ionizing coefficient
$V_i n$=the increase in electron density
$D_a\nabla^2 n$=represents the loss in electron density due to diffusion After the ionizing pulse is removed, $V_i n=0$ and $$\text{(3)} \qquad \frac{\partial n}{\partial t}=-D_a\nabla^2 n$$

that is, the decay rate is purely a function of diffusion. Equation 3 may be solved by Fourier series method: the higher order terms decay rate is much greater than the first term. A first approximation solution of (3) is $$\text{(4)} \qquad n=n_{-01}(x,y,z)e^{-(D_a/\Lambda^2_e)t}$$

The decay in density is noted to be exponential with a time constant, $\tau$.

$$\text{(5)} \qquad \tau=\frac{\Lambda^2 e}{D_a}=\frac{\Lambda^2 eP}{D_{ap}}$$

where $\Lambda e$=characteristic diffusion length
$p$=gas pressure millimeters Hg
$\tau$=time to decay to $\frac{1}{e}$ value
$Da$=ambipolar diffusion coefficient The effective diffusion length $\Lambda_e$ in the presence of a magnetic field B may be closely approximated by $$\text{(6)} \qquad \Lambda e=\frac{L}{\pi}$$

where L is the length of the tube parallel to the magnetic field. Then we write $$\text{(7)} \qquad \tau=\frac{L^2 P}{\pi^2 D_{ap}}\frac{T_0}{T_{-}}$$

where $T_0$=room temperature
$T_{-}$=electron temperature
$D_{ap}$=ambipolar diffusion coefficient for pressure $p$.

A specific example of a typical decay time of an embodiment of my invention such as illustrated in FIG- URES 1 and 2, wherein the tube has a length of 3.4 centimeters, a temperature ratio of $$\frac{T_0}{T_-}=\frac{1}{80}$$

the envelope contains argon gas at a pressure of 0.1 mm. and $D_{ap}=900$, is characterized by equation 7; substituting these values $$\tau=\frac{L^2P}{\pi^2D_{ap}}\cdot\frac{T_0}{T_-}=\frac{(3.4)^2}{7.2\times10^6}=1.6 \text{ microsec.}$$

The presence of a magnetic field in my invention permits the utilization of a much lower gas pressure by a factor of ten or even one hundred less than in a tube without the magnetic field. This is possible because in a tube without the magnetically controlled plasma the tube is subject to rapid failure at low gas pressures due to positive ion bombardment of the walls and subsequent overheating. A second effect which shortens the recovery time of an electron discharge tube in the presence of a strong magnetic field is the fact that the ambipolar diffusion coefficient $D_{ap}$ is multiplied by the ratio of the room temperature and the electron temperature. These two effects together can account for as much as four orders of magnitude improvement in the recovery time rate in a gas discharge tube over a tube having similar design parameters but without the magnetic field.

FIGURES 5 and 5*b* illustrate in schematic form typical mountings of TR and ATR tubes in a branched duplexer. FIGURE 5*c* illustrates schematically the arrangement of the various components in a balanced duplexer system. The embodiment of my invention as applied to a TR tube illustrated in FIGURES 1 and 2, such as for instance may be adapted to any kilomegacycle device, is installed in duplexing systems in the conventional manner. FIGURES 5 and 5*b* illustrate the relative positioning of the ATR, pre-TR and TR tubes with respect to each other and the transmitter, receiver and antenna.

ATR tubes which embody my invention are easily constructed by the application of a magnetic field to an envelope containing an ionizable gas and having only a single resonant opening.

FIGURE 5*c* shows a balanced duplexer with crystal protectors in conventional positions. An embodiment of my invention such as illustrated in FIGURES 1 and 2 may be inserted in the positions designated as crystal protectors.

Figures 3, 4:
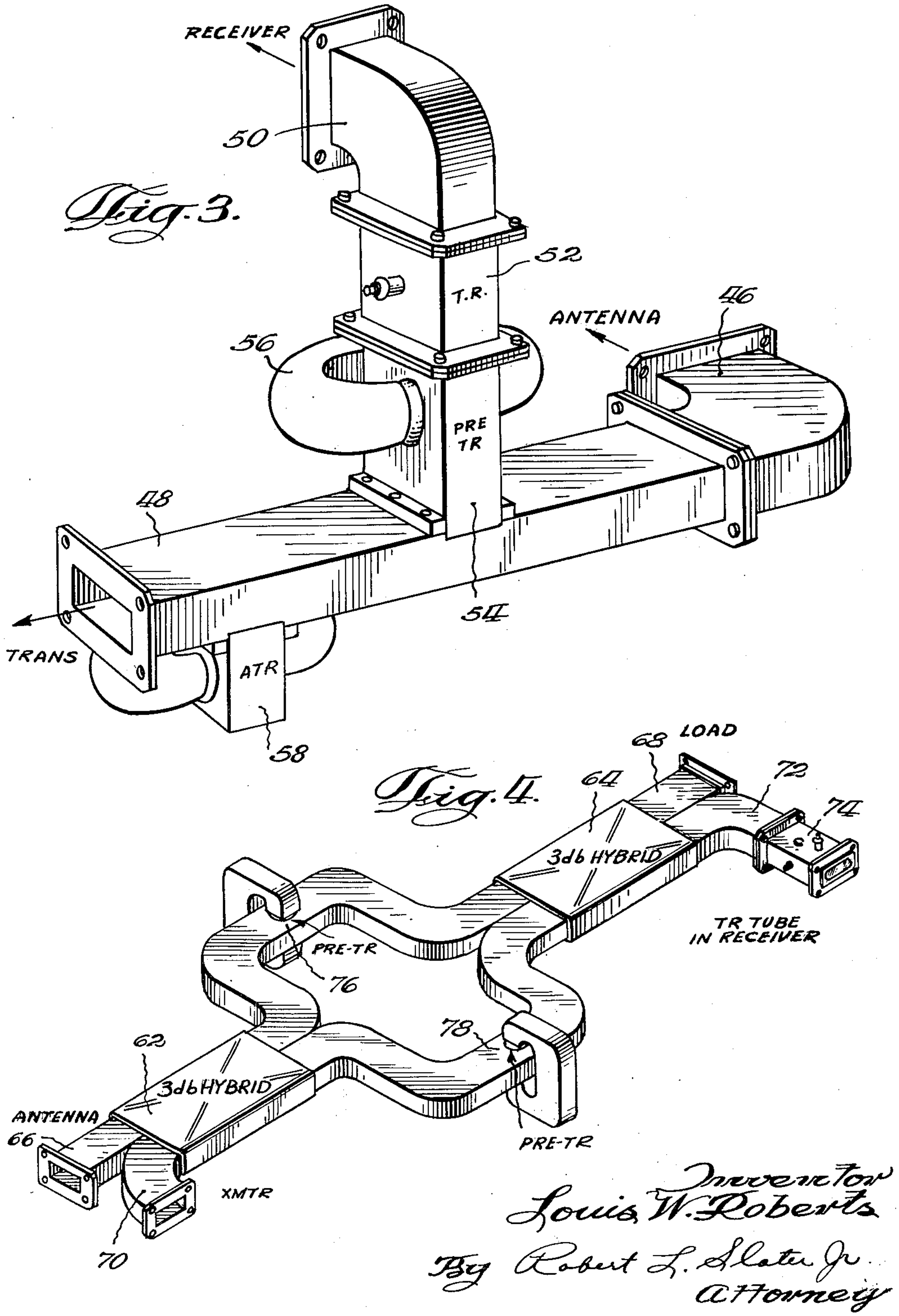

FIGURES 3 and 4 are perspective views of rectangular wave guide branched and balanced duplexers respectively in which improved ATR, pre-TR and TR tubes embodying my invention have been mounted. Referring now to FIGURE 3, wave guide 46 connected to an antenna is coupled to a transmitter by a straight wave guide section 48. Mounted to the wave guide 48 is an improved ATR tube 58 which embodies my invention, and in spaced relationship thereto an improved pre-TR tube 54 to which an external magnet 56 has been adapted. A conventional TR tube 52 is mounted between the pre-TR tube 54 and the wave guide connector 50, which in turn couples into a receiver not shown in the illustrations.

The embodiments of my invention illustrated at 56 and 58 in FIGURE 3 and pictured in FIGURE 4 are described in detail below in connection with FIGURE 6.

Referring now to FIGURE 4, the two sides of a balanced rectangular wave guide duplexer are connected together with 3 db hybrid connectors 62 and 64. Extending outward from the hybrid connector 62 are connecting extensions 66 and 70 to the antenna and transmitter, respectively. Extending outwardly from the hybrid connector 64 are connecting extensions 68 and 72 to a load and receiver TR tube, respectively. Positioned between the two hybrid connectors 62 and 64 are balanced arms in which my novel improved pre-TR tubes 76 and 78 are inserted.

The branched duplexer of FIGURE 3 and the balanced duplexer of FIGURE 4 illustrate the ready adaptability to conventional installations of electron discharge tubes embodying the principles of my invention. The performance characteristics of these duplexers are greatly improved due to my invention with respect to power handling capability and improved recovery time rate. Power handling capacity of from ten to one hundred and more times that of conventional duplexers with ordinary ATR, pre-TR and TR tubes is achieved by the adaption of my invention to these conventional duplexers. The particular embodiment of my invention illustrated in these duplexers at 54, 58, 76 and 78 does not have provision for liquid coolant but depends upon conduction outward of heat generated within the tube through the ends of the respective envelopes, through the adjacent magnetic cores and, hence, dissipated by radiation and convection into the surrounding environment. The recovery time rate of these duplexers is up to four orders of magnitude improved over comparable conventional duplexers.

Figure 6:
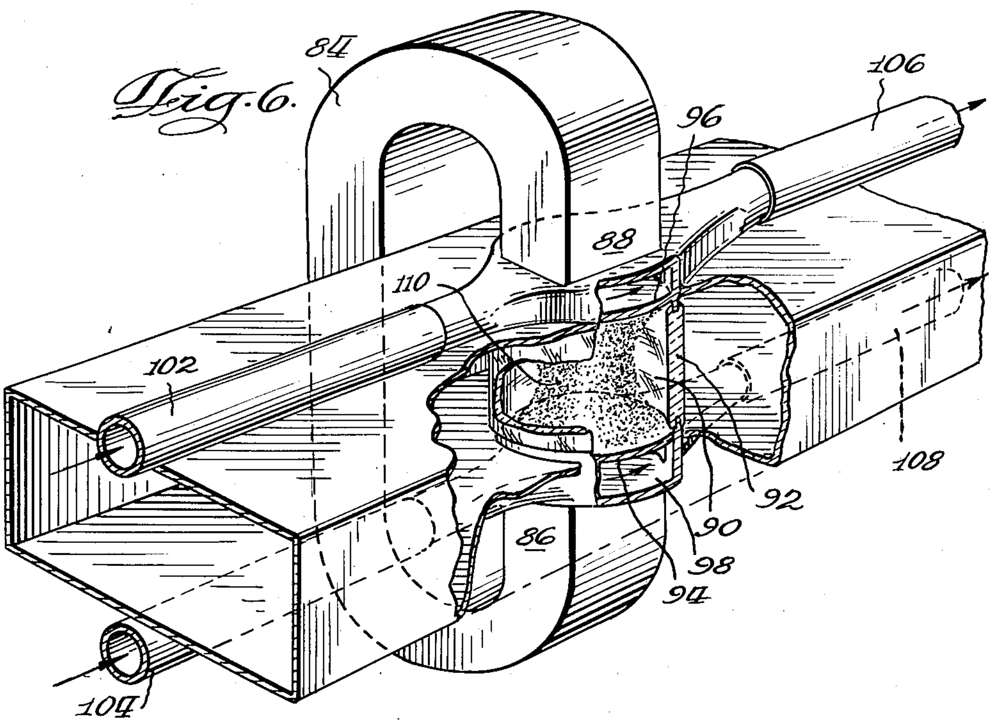

FIGURE 6 is a partially cut-away perspective view of another preferred embodiment of my invention similar in all respects to the embodiments shown in FIGURES 3 and 4 but with the additional provision for circulating liquid coolant about the ends of the tube. Referring now to the drawings, a permanent magnetic core 84 having poles 86 and 88 is mounted over a rectangular wave guide section in which a cylindrical gas tight cavity 90 has been positioned. The cavity 90 is comprised of a glass cylinder 92 onto which are sealed circular metallic ends 92 and 94. The ends of the cavity 90 are provided with coolant jackets 98. Liquid coolant, such as water, may be passed into the coolant jackets through liquid conduits 102 and 104 and out of the jackets through conduits 106 and 108. The cavity 90 and the magnetic core 84 are positioned so that the strong magnetic field between the poles 86 and 88 passes longitudinally through the cylindrical cavity 90.

When low power microwave signals pass along the wave guide the ionizable gas contained within the cavity 90 is not ionized and the signal passes through the cavity without appreciable attenuation. When high powered microwave signals pass into the cavity the gas is ionized and forms a highly conductive plasma of electrons and positive ions which alters the impedance of the wave guide and attenuates the incoming signal by 40 to 60 db and more. The plasma is constrained to a cylindrical region 110 within the magnetic field between poles 86 and 88. In accordance with the principles described above, the heat evolved in the plasma is transmitted out of the tube mainly through the ends 94 and 96 where it is readily carried away by liquid coolant. The diffusion rate of the plasma 110 and the recovery rate of the tube after removal of the high power signal is improved from one to four orders of magnitude by the presence of the magnetic field.

Figure 7:
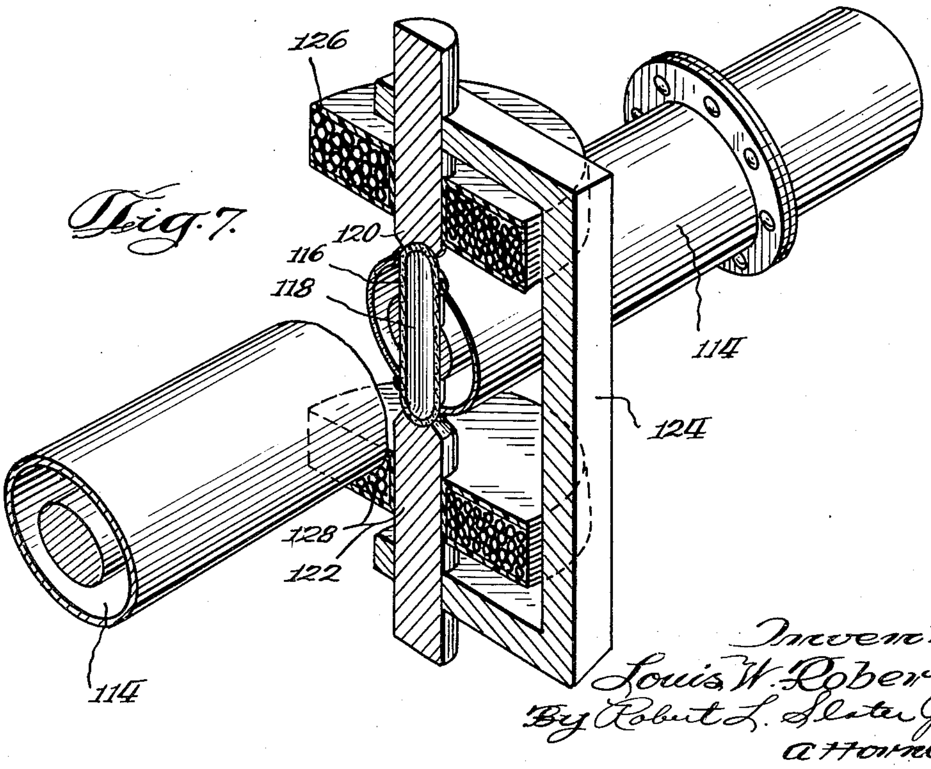

Still another preferred embodiment of my invention is illustrated in FIGURE 7 wherein a coaxial circular wave guide 114 is provided with an elongated cylindrical glass gas tight envelope 116 mounted transversely on a diameter of the wave guide 114. The cavity 118 formed within the envelope 116 contains a small quantity of ionizable gas. For instance, any noble gas at a pressure of from 100 to 500 microns pressure is suitable; a preferred gas charge is pure argon at a pressure of 100 microns.

Electromagnet poles 120 and 122 connected by a core 124 are positioned at either end of the envelope 116. Electromagnetic windings 126 and 128 are mounted about the poles 120 and 122, respectively. With this arrangement the characteristics of the tube such as recovery rate and arc loss may be controlled remotely by electronic means.

The operating characteristics and applications of the embodiment of my invention shown in FIGURE 7 are similar in all respects to those characteristics and applications described for the adaptations of my invention shown in FIGURES 1 and 6. The electromagnetic windings are readily applicable to other adaptations of my invention and merely give a measure of control over the tube characteristics not heretofore available.

The foregoing drawings and specifications of various adaptations of my invention are merely illustrative of my invention, the scope of which is defined by the following claims.

I claim:

1. A gaseous electron discharge tube adapted to propogating electromagnetic energy there through comprising; an envelope with walls; ionizable gas contained within the envelope, dielectric materials mounted within the walls, means for passing a magnetic field of strength greater than that required for cyclotron resonance of electrons through the envelope in a plane parallel to the electric field vector of electromagnetic energy propagated through the envelope; whereby free electrons in high density concentration resulting from ionization during the gaseous electron discharge within the envelope are restrained from contact with the dielectric materials by interaction with the magnetic field.

2. An electron tube for switching radio frequency energy comprising an ionizable gas; means having a plurality of connected wall portions containing the gas and passing the radio frequency energy through the gas and means for passing a magnetic field through the gas in a plane at right angles to the direction of propagation of the radio frequency energy through the gas, the magnetic field having sufficient strength such that the cyclotron resonance frequency of electrons is greater than the collision frequency of electrons in the ionized gas, whereby highly energized free electrons resulting from ionization of the gas are constrained from contact with certain surfaces of the said wall portion of the means for containing the gas by their interaction with the magnetic field.

3. An electron tube for controlling radio frequency energy within a wave guide structure comprising a gas tight envelope, ionizable gas contained within the envelope, resonant window structures mounted on the sides of the envelope for transmitting the energy into and out of the interior of the envelope, means for inducing a magnetic field in a plane perpendicular to the direction of propagation of radio frequency energy through the envelope, and means for cooling the tube at the surfaces thereof through which the magnetic field passes into the envelope, the magnetic field being of sufficient strength so that the cyclotron frequency is greater than the collision frequency of electrons in the ionized gas, whereby highly energized free electrons resulting from ionization of the gas interact with the magnetic field, are restrained from contact with the windows and constrained to trajectories terminating on the means for cooling the tube.

4. An electron tube for switching high powered radio frequency energy comprising means for forming a magnetic field, a gas tight envelope positioned within the magnetic field of strength greater than that required for cyclotron resonance, means for removing heat from the envelope positioned on opposite sides of the envelope transverse of the direction of the magnetic field, an ionizable gas contained within the envelope, and resonant window means for conducting the radio frequency energy into and out of the gas within the envelope whereby electrons resulting from the ionization of the gas are constrained by interaction with the magnetic field to move in trajectories which terminate on the means for removing heat from the envelope.

5. A gas filled electron tube for switching radio frequency energy comprising a gas tight envelope having parallel sides, an ionizable gas within the envelope, resonant means on the sides of the envelope for conducting radio frequency electromagnetic waves into and out of the envelope, a magnet comprising a curved core piece with ends separated by a gap, the core being positioned exterior of the envelope, the envelope being placed in a gap between the ends of the core piece wherewith the magnetic field between the ends of the magnet of strength greater than that required for cyclotron resonance of electrons passes through the envelope in a plane at right angles to the direction of propagation of the waves through the envelope, and water jackets for cooling the tube juxtaposed to the envelope under the core ends whereby electrons resulting from the ionization of the gas interact with the magnetic field and are constrained to move in trajectories that terminate on the envelope juxtaposed to the water jackets.

6. An electron tube for switching polarized coherent radio frequency energy having an E plane and H plane comprising an ionizable gas, means for containing the gas, a second means for passing the polarized energy through the gas, and a third means for passing a magnetic field of strength greater than that required for cyclotron resonance of electrons through the gas in a plane parallel to the E plane of the energy and at right angles to the direction of propagation of the polarized energy through the gas whereby electrons and ions in the ionized gas interact with the magnetic field and are constrained to trajectories which avoid the second means.

7. A gaseous electron discharge tube comprising a gas tight sealed envelope, dielectric material means in the wall of the envelope, an ionizable gas at a selected pressure contained within the envelope, and means for passing a magnetic field through the envelope parallel to the means in the wall wherein the gas pressure and the magnetic field strength are related to one another such that the magnetic field is sufficiently strong to assure the cyclotron frequency of electrons present in the ionized gas will be larger than the collision frequency of the electrons at the selected gas pressure whereby the electrons will interact with the magnetic field and be constrained to trajectories which avoid the dielectric material means.

8. A gaseous electron discharge tube for attenuating polarized radio frequency energy having an E plane and an H plane comprising an envelope having dielectric means in the wall thereof, an ionizable gas at a selected pressure contained therein, a second means for passing a magnetic field through the envelope in a plane parallel to the E plane of the radio frequency energy, the magnetic field strength being sufficiently large to make the cyclotron frequency of electrons in the ionized gas greater than the collision frequency of the electrons at the selected gas pressure whereby the electrons in the ionized gas interact with the magnetic field and are caused to move in spiral trajectories which avoid the dielectric means.

9. A high power microwave switch tube comprised of a section of sealed gas tight wave guide having an E plane and an H plane, resonant windows in the ends of the guide, an ionizable gas contained within the wave guide, means for passing a magnetic field of strength greater than that required for cyclotron resonance of electrons through the wave guide parallel to the E plane and at right angles to the direction of propagation of the waves through the guide, and cooling means juxtaposed to the wave guide on those sides through which the magnetic field intersects the guide whereby the electrons in the ionized gas interact with the magnetic field and are constrained to move on trajectories which terminate on the wave guide adjacent to the cooling means.

10. A gas filled electron tube for switching polarized radio frequency energy having an E plane and an H plane comprising a gas tight envelope having sidewalls, an ionizable gas within the envelope, resonant means positioned in the sidewalls of the envelope for conducting radio frequency electromagnetic waves into and out of the envelope, a permanent magnet comprised of a curved core piece having ends and a gap therebetween positioned exterior of the envelope, the envelope being placed in the gap between the ends of the core piece, the magnetic field of strength greater than that required for cyclotron resonance passes through the envelope and is parallel to the E plane of the waves and at right angles to the direction of propagation of the waves through the envelope, and water jackets for cooling the tube juxtaposed to the envelope under the core ends whereby electrons in the ionizable gas interact with the magnetic field and are constrained to avoid the resonant means and move in trajectories which terminate on the envelope adjacent to the water jackets.

11. An improved gaseous electron discharge tube comprising a gas tight envelope having dielectric material therein and containing an ionizable gas at a selected pressure; means for passing radio frequency energy having an electrical field vector through the envelope; electromagnetic means for impressing a magnetic field on the gas parallel to the electric field vector and of sufficient strength so that the cyclotron frequency of electrons in the ionized gas is greater than the electron collision frequency at the selected gas pressure and means for cooling the tube juxtaposed the envelope transverse of the magnetic field whereby the electrons in the ionized gas interact with the magnetic field and are constrained to move in spiral trajectories having axis parallel to the electric vector.

12. A high power gaseous switching tube comprising an envelope for containing on ionized gas, magnetic means for passing a magnetic field through the envelope having field strength greater than that required for cyclotron resonance of electrons in the ionized gas and therewith to restrict the charged particles in the ionized gas to a high density region within the envelope, and means for cooling the envelope at points in contact with the high density charged particles.

13. A method of cooling a gaseous discharge tube having an ionizable gas filled enclosure comprising the steps of applying a magnetic field to the enclosure having sufficient field strength to make the cyclotron resonance frequency of the ionized gas greater than the collision frequency of the electrons in the ionized gas, and then cooling the enclosure by means at those surfaces where the magnetic field intersects the enclosure.

References Cited in the file of this patent

UNITED STATES PATENTS

| | | |
|---|---|---|
| 2,879,485 | Carter et al. | Mar. 24, 1959 |
| 2,902,614 | Baker | Sept. 1, 1959 |
| 2,920,236 | Chambers et al. | Jan. 5, 1960 |
| 2,940,011 | Kolb | June 7, 1960 |
| 2,947,956 | Alexander et al. | Aug. 2, 1960 |

OTHER REFERENCES

Technical Report MPL–8, by S. J. Tetenbaum and R. M. Hill, High Power Magnetic Field Controlled Microwave Gas Discharge Switch, Sylvania Microwave Physics Lab., Mountain View, Calif., pub. July 22, 1957.